United States Patent Office 3,339,844
Patented Sept. 5, 1967

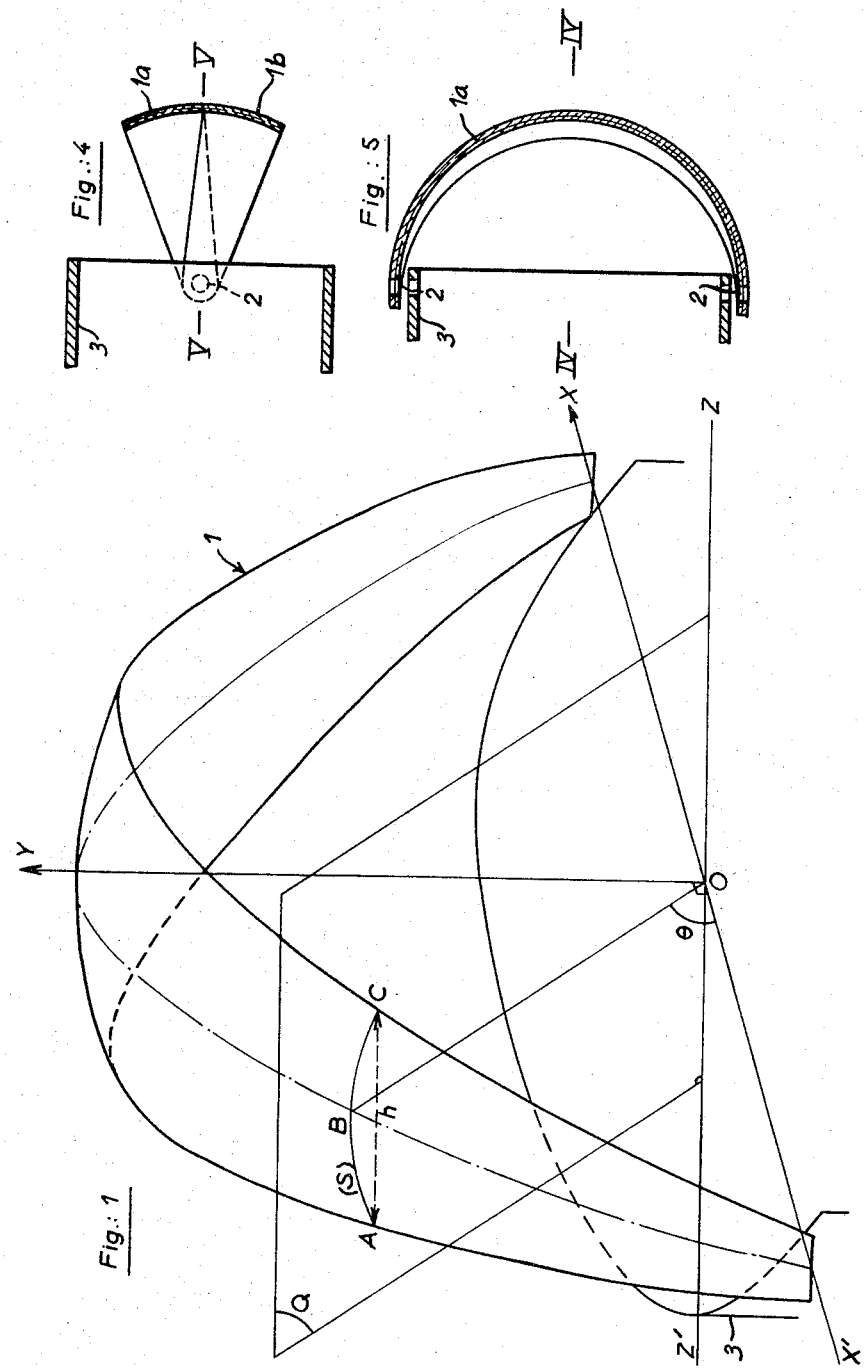

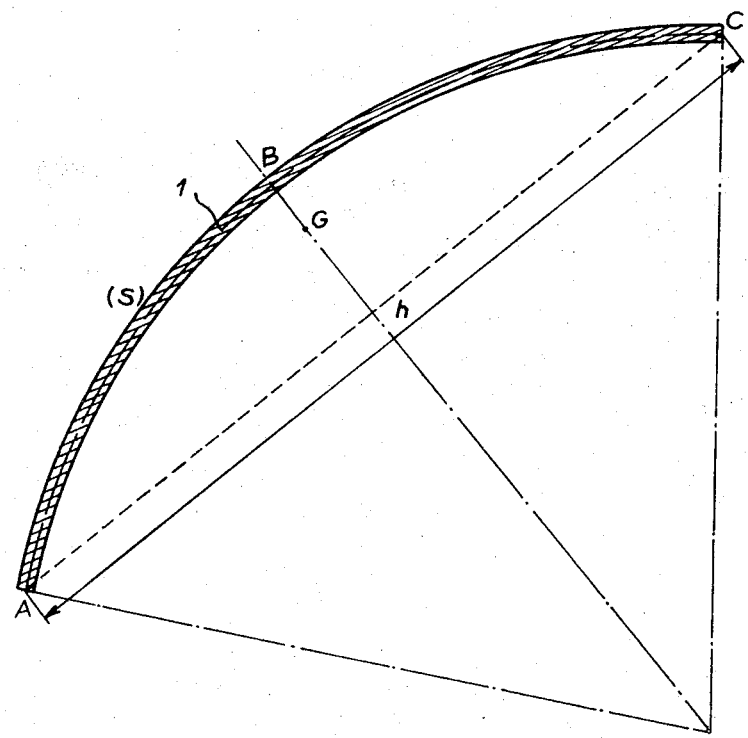
Fig.:2

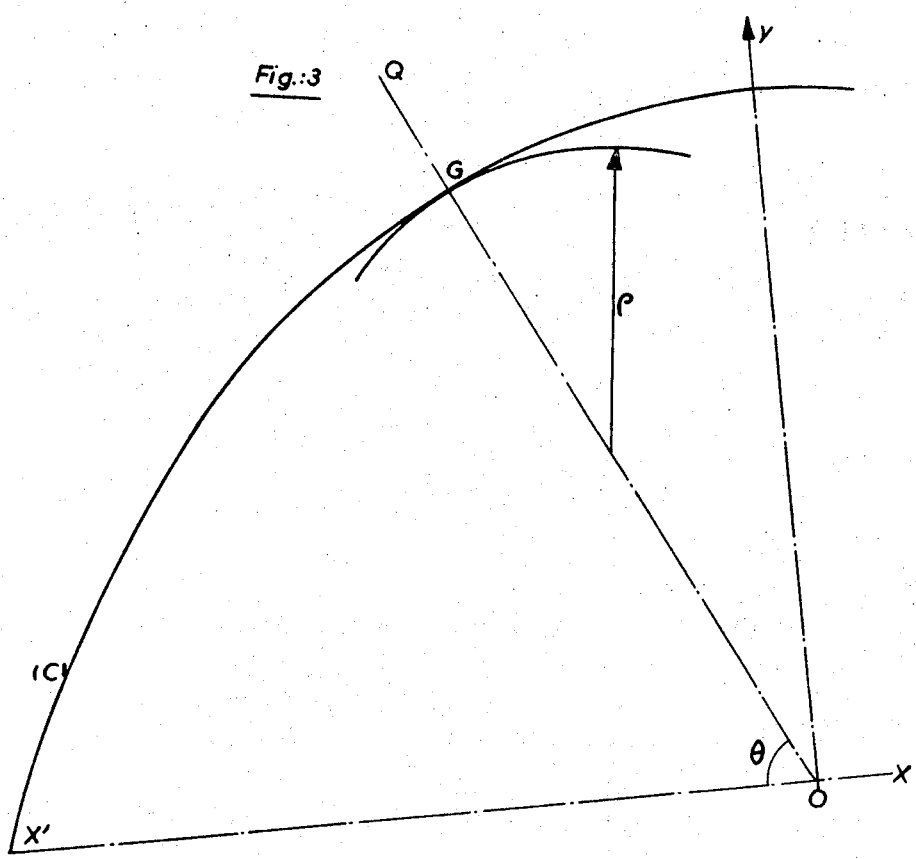
Fig.:3

3,339,844
JET-DEFLECTING OBSTRUCTIONS OR THE LIKE
Georges Brenet, Crisenoy-par-Guignes-Rabutin, and Claude Stoltz, Avon, France, assignors to Societe Nationale d'Etude et de Construction de Moteurs d'Aviation, Paris, France, a company of France
Filed June 1, 1965, Ser. No. 460,319
Claims priority, application France, June 2, 1964, 976,760
3 Claims. (Cl. 239—265.19)

This invention relates to jet-deflecting obstructions or the like of the kind used in the thrust reversers of jet propulsion units. Such a thrust reverser is generally constituted by two obstructions having the appearance of jaws and articulated to the ejection nozzle or duct of the jet propulsion unit at the two ends of a diameter of the latter.

In the normal flight position each of the jaws is retracted on either side of the nozzle or duct in such manner that the ejection of the jet is not impeded. In the braking position the jaws turn symmetrically until they come into contact at their rear edge in front of the ejection duct. The jet, deflected first of all by the obstructions, undergoes a second deflection through grids of vanes so as to obtain a total deflection of more than 90° which produces a counter-thrust.

The jet-deflecting jaws are made of sheet metal and they each have geometrically the general form of a lune.

The present invention is concerned with a special conformation of the obstructions or jaws which is adapted to achieve a zero bending moment and a zero shearing stress at all points for conditions usual at the given limits. This results in a substantial reduction of the thicknesses of sheet metal, while employing materials having the most favorable weldability, mechanical characteristics and behavior in response to thermal shocks.

According to the invention the obstruction is shaped in such manner that, if its sections are considered on a plane passing through the axis of the ejection duct and turning about this axis, the radius of curvature of the geometrical locus of the centers of gravity of the said sections is in inverse proportion to the chord of the obstruction at any section considered.

One method of carrying the invention into effect will now be described, by way of example, with reference to the accompanying drawings, in which:

FIGURE 1 is a diagrammatic perspective view of a thrust-reversing obstruction according to the invention in the retracted or withdrawn position.

FIGURE 2 is a section of the obstruction illustrated in FIGURE 1 taken on a plane passing through the axis of the ejection duct.

FIGURE 3 gives the curve of the geometrical locus of the centers of gravity of the sections of this obstruction.

FIGURE 4 is a section of a thrust reverser on the line IV—IV of FIGURE 5, and

FIGURE 5, conversely, is a section thereof on the line V—V of FIGURE 4.

FIGURE 1 illustrates very diagrammatically an obstruction 1 formed of an inwardly curved metal sheet of plate and of the so-called "jaw" or "man-trap" type, this obstruction pivoting about the horizontal diametral axis X'OX of the ejection nozzle or duct 3 of a jet propulsion unit, of which Z'OZ is the longitudinal axis and OY the vertical radial axis.

If we consider a movable plane Q passing through the longitudinal axis Z'OZ and defined by its angle $\theta$ with the horizontal X'OX, this plane intersects the obstruction 1 along a section S in the form of an arc ABC which subtends a chord AC having a length $h$ (see also FIGURE 2, in which the point G designates the center of gravity of the section considered). When the angle $\theta$ varies, the point G describes a curve C shown in FIGURE 3 and which is consequently the geometrical locus of the centers of gravity of the sections S of the obstruction 1 on the plane Q pivoting about the axis Z'OZ. For any value of $\theta$, the curve C has a radius of curvature $\rho$.

In accordance with the invention the obstruction 1 is shaped in such manner that at each section S corresponding to any value whatsoever of $\theta$, the radius of curvature $\rho$ is in inverse proportion to the chord $h$, that is to say $\rho = k/h$, where $k$ is a constant.

In FIGS. 4 and 5 there will be seen orthogonal sections of a thrust reverser comprising two obstructions 1a–1b with their bearings 2—2 centered on the diametral axis X'OX of the ejection nozzle 3.

It is obvious that the invention does not apply solely to thrust-reversing obstructions, but also covers those cases where sheet-metal parts are stressed in a similar manner to that obtaining in thrust-reversing obstructions.

What is claimed is:

1. A jet-deflecting obstruction of such shape that, considering its sections on a plane passing through the axis of an ejection duct for the jet with which the obstruction is to be used, and turning about such axis, the radius of curvature of the geometrical locus of the centers of gravity of said sections is in inverse proportion to the chord of the obstruction at any section considered.

2. A jet-deflecting arrangement for a jet propulsion unit, comprising in combination an ejection duct and a jet-deflecting obstruction articulated to said ejection duct at points at the two ends of a diameter of said duct, said jet-deflecting obstruction being of such shape that, considering its sections on a plane passing through the axis of said ejection duct and turning about such axis, the radius of curvature of the geometrical locus of the centers of gravity of said sections is in inverse proportion to the chord of the obstruction at any section considered.

3. A jet-deflecting arrangement for a jet propulsion unit, comprising in combination an ejection duct and two jet-deflecting obstructions each articulated to said ejection duct at points at the two ends of a diameter of said duct each said jet-deflecting obstruction being of such shape that, considering its sections on a plane passing through the axis of said ejection duct and turning about such axis, the radius of curvature of the geometrical locus of the centers of gravity of said sections is in inverse proportion to the chord of the obstruction at any section considered.

References Cited
UNITED STATES PATENTS

| | | | |
|---|---|---|---|
| 2,481,330 | 9/1949 | Neal | 239—265.37 |
| 2,735,264 | 2/1956 | Jewett | 239—265.37 |
| 2,987,879 | 6/1961 | Brown | 239—265.19 X |
| 3,224,370 | 12/1965 | Vogt | 239—265.19 X |

M. HENSON WOOD, Jr., Primary Examiner.

VAN C. WILKS, Assistant Examiner.